United States Patent
Kang et al.

(10) Patent No.: US 9,746,191 B2
(45) Date of Patent: Aug. 29, 2017

(54) SYSTEM FOR PRODUCING HEAT SOURCE FOR HEATING OR ELECTRICITY USING MEDIUM/LOW TEMPERATURE WASTE HEAT, AND METHOD FOR CONTROLLING THE SAME

(71) Applicant: POSCO ENERGY CO., LTD., Seoul (KR)

(72) Inventors: Min Cheol Kang, Incheon (KR); Hyo Seok Lee, Seoul (KR); Jong Kook Seong, Incheon (KR)

(73) Assignee: POSCO ENERGY CO., LTD., Seoul (KR)

( * ) Notice: Subject to any disclaimer, the term of this patent is extended or adjusted under 35 U.S.C. 154(b) by 107 days.

(21) Appl. No.: 14/893,287

(22) PCT Filed: May 20, 2014

(86) PCT No.: PCT/KR2014/004482
§ 371 (c)(1),
(2) Date: Nov. 23, 2015

(87) PCT Pub. No.: WO2014/189248
PCT Pub. Date: Nov. 27, 2014

(65) Prior Publication Data
US 2016/0109138 A1     Apr. 21, 2016

(51) Int. Cl.
| | |
|---|---|
| *F24D 3/18* | (2006.01) |
| *F01K 13/00* | (2006.01) |
| *F25B 30/04* | (2006.01) |
| *F25B 27/02* | (2006.01) |
| *F01K 13/02* | (2006.01) |
| *F01K 23/10* | (2006.01) |
| *F24D 19/10* | (2006.01) |

(Continued)

(52) U.S. Cl.
CPC ............ *F24D 3/18* (2013.01); *F01K 13/00* (2013.01); *F01K 13/02* (2013.01); *F01K 17/005* (2013.01);

(Continued)

(58) Field of Classification Search
CPC .... F01K 13/02; F01K 23/101; F24D 19/1006; F24D 3/18
See application file for complete search history.

(56) References Cited

U.S. PATENT DOCUMENTS

| | | | |
|---|---|---|---|
| 4,444,015 A | | 4/1984 | Matsumoto et al. |
| 4,541,246 A | * | 9/1985 | Chang ...................... C02F 1/22 60/641.1 |

(Continued)

FOREIGN PATENT DOCUMENTS

| | | |
|---|---|---|
| CN | 101906997 A | 12/2010 |
| JP | 03141806 A * | 6/1991 |

(Continued)

OTHER PUBLICATIONS

Extended European Search Report dated Feb. 23, 2017.

*Primary Examiner* — Patrick Maines
(74) *Attorney, Agent, or Firm* — Rabin & Berdo, P.C.

(57) ABSTRACT

A system for producing a heat source for heating or electricity, using medium/low-temperature waste heat includes: an absorption-type heat pump (100) supplied with a driving heat source and heat source water to heat a low-temperature heat medium; a regenerator heat exchange unit (210) for supplying a regenerator (110) with a driving heat source using waste heat; an evaporator heat exchange unit (220) for supplying an evaporator with heat source water; a heat medium circulation line (310) for circulating a heat medium; a generation unit (400) branching off from the heat medium circulation line (310) and producing electricity; a heat production unit (500) branching off from the heat medium circulation line (310) and supplying a heat-demanding place with a heat source for heating; and a switching valve unit (600) for controlling the flow of heat medium supplied the generation unit (400) or the heat production unit (500).

13 Claims, 8 Drawing Sheets

(51) Int. Cl.
  *F01K 17/00* (2006.01)
  *F01K 23/00* (2006.01)
  *F25B 15/06* (2006.01)
(52) U.S. Cl.
  CPC ............ *F01K 23/00* (2013.01); *F01K 23/101* (2013.01); *F24D 19/1006* (2013.01); *F25B 27/02* (2013.01); *F25B 30/04* (2013.01); *F24D 2200/126* (2013.01); *F24D 2200/16* (2013.01); *F24H 2240/127* (2013.01); *F25B 15/06* (2013.01); *F25B 2700/21172* (2013.01); *F25B 2700/21173* (2013.01); *Y02E 20/14* (2013.01); *Y02E 20/16* (2013.01)

(56) References Cited

U.S. PATENT DOCUMENTS 4,873,840 A * 10/1989 Gilliusson ............... F01K 17/02
　　　　　　　　　　　　　　　　　　　237/12.1
2011/0041505 A1* 2/2011 Kasuya ................. F01K 23/065
　　　　　　　　　　　　　　　　　　　60/660
2013/0160446 A1* 6/2013 Paya Diaz ............... F03G 6/00
　　　　　　　　　　　　　　　　　　　60/641.7

FOREIGN PATENT DOCUMENTS

| | | | |
|---|---|---|---|
| JP | 2005-248877 A | | 9/2005 |
| JP | 2005248877 A | * | 9/2005 |
| JP | 2012-241718 A | | 12/2012 |
| KR | 20-0369438 Y1 | | 12/2004 |
| KR | 10-2010-0021948 A | | 2/2010 |
| KR | 10-2010-0078421 A | | 7/2010 |
| KR | 10-0975276 B1 | | 8/2010 |
| KR | 10-1052776 B1 | | 7/2011 |
| KR | 10-2012-0128753 A | | 11/2012 |
| KR | 10-1295806 B1 | | 8/2013 |
| KR | 101295806 B1 | * | 8/2013 |
| WO | WO 01/44658 A1 | | 6/2001 |
| WO | WO 0144658 A1 | * | 6/2001 ............. F01K 25/08 |

* cited by examiner

SYSTEM FOR PRODUCING HEAT SOURCE FOR HEATING OR ELECTRICITY USING MEDIUM/LOW TEMPERATURE WASTE HEAT, AND METHOD FOR CONTROLLING THE SAME

TECHNICAL FIELD

The present invention relates to a system for producing a heat source for heating or electricity, using medium- or low-temperature waste heat, and a method for controlling the same. The present invention more particularly relates to a system for selectively producing a heat source for heating or electricity by means of an adsorption-type heat pump, using medium- or low-temperature waste heat, thereby improving waste heat recovery efficiency, and to a method for controlling the system.

BACKGROUND ART

Recently, an adsorption-type heat pump has been used as waste heat recovery means for recovering waste heat generated by a power plant or an industrial plant.

For example, Koran Patent No. 10-975276 (registered on Aug. 5, 2010) and Korean Patent No. 10-1052776 (registered on Jul. 25, 2011) suggest heating water supply systems for district heating based on an adsorption-type heat pump.

However, the heating water supply systems based on an adsorption-type heat pump are highly efficient in recovering waste heat generated by a power plant or an industrial plant in winter seasons in which demand for heating is high but have low waste heat recovery efficiency in summer seasons in which demand for heating is low because an operation ratio of the heat pump is low in summer seasons.

DOCUMENTS OF RELATED ART

1. Korean Patent No. 10-975276 (Registered on Aug. 5, 2010)
2. Korean Patent No. 10-1052776 (Registered on Jul. 25, 2011)

DISCLOSURE

Technical Problem

Accordingly, the present invention has been made keeping in mind the above problems occurring in the related art, and an object of the present invention is to provide a system for producing a heat source for heating or electricity by means of an adsorption-type heat hump using medium- or low-temperature waste heat and a method for controlling the same system. The system can selectively produce a heat source for heating or electricity, thereby improving waste heat recovery efficiency.

Technical Solution

In order to accomplish the object of the invention, according to one aspect, there is provided a system for producing a heat source for heating or electricity using medium- or low-temperature waste heat, the system including: an absorption-type heat pump supplied with a driving heat source and heat source water to increase a temperature of a low-temperature heat medium to a high temperature by means of absorption heat in an absorber and condensation heat in a condenser and to discharge the heat medium; a regenerator heat exchange unit for supplying a regenerator with a driving heat source using medium- or low-temperature waste heat; an evaporator heat exchange unit for supplying an evaporator with heat source water; a heat medium circulation line of a closed loop structure for circulating a heat medium that is heated by passing through the absorber and the condenser; a generation unit branching off from the heat medium circulation line to undergo indirect heat exchange with the high-temperature heat medium and to drive a steam turbine on the basis of the Rankine cycle, thereby producing electricity; a heat production unit branching off from the heat medium circulation line to undergo indirect heat exchange with the high-temperature heat medium and to supply a heat-demanding place with a heat source for heating; and a switching valve unit provided on the heat medium circulation line to control the flow of the heat medium such that the heat medium is supplied to the generation unit or the heat production unit.

Preferably, the evaporator heat exchange unit may undergo heat exchange with sea water.

Preferably, the heat production unit may include a condenser that condenses vapor that exits from the steam turbine and an LNG evaporator that undergoes heat exchange with the condenser.

Preferably, the generator heat exchange unit may include: a first heat exchange unit that circulates and supplies a driving heat source to a generator of the heat pump; and a second heat exchange unit that causes exhaust gas that exits from a chimney of a power plant and the first heat exchange unit to undergo indirect heat exchange with each other.

Preferably, the system may further include a third heat exchange unit provided on a driving heat source circulation line that is used for circulating a driving heat source between the generator heat exchange unit and the generator of the heat pump, wherein the third heat exchange unit undergoes heat exchange through bleeding of an exhaust heat recovery boiler that recovers heat using exhaust gas discharged from a chimney of a power plant.

More preferably, the third heat exchange unit may further include a control valve that is arranged on the driving heat source circulation line so as to be connected in series to the generator heat exchange unit and that controls bleeding.

Preferably, the switching valve may include: a first switching valve module that controls the flow of the heat medium such that the heat medium is supplied to the generation unit; and a second switching valve module that controls the flow of the heat medium such that the heat medium is supplied to the heat production unit, wherein the first switching valve module and the second switching valve module are arranged in series with each other on the heat medium circulation line and interlocked with each other to be opened and closed together.

According to another aspect, there is provided a method for controlling a system for producing a heat source for heating or electricity, using medium- or low-temperature waste heat, the system comprising: an absorption-type heat pump that includes a generator, a condenser, an evaporator, and an absorber, is supplied with a driving heat source and heat source water to increase a temperature of a heat medium to a high temperature by means of absorption heat in the absorber and condensation heat in the condenser, and to discharges the heated heat medium; a regenerator heat exchange unit for supplying a regenerator with a driving heat source using medium- or low-temperature waste heat; an evaporator heat exchange unit for supplying an evaporator with heat source water; a heat medium circulation line of a closed loop structure for circulating a heat medium that is heated by passing through the absorber and the condenser; a generation unit branching off from the heat medium circulation line to undergo indirect heat exchange with the high-temperature heat medium and to drive a steam turbine on the basis of the Rankine cycle, thereby producing electricity; a heat production unit branching off from the heat medium circulation line to undergo indirect heat exchange with the high-temperature heat medium and to supply a heat-demanding place with a heat source for heating; and a switching valve unit provided on the heat medium circulation line to control the flow of the heat medium such that the heat medium is supplied to the generation unit or the heat production unit, the method including: switching the switching valve unit according to heat source demand of the heat-demanding place, thereby supplying the heat-demanding place with the heat source for heating by means of the heat production unit, when the heat source demand is higher than preset heat source demand but producing electricity by means of the generation unit when the heat source demand is equal to or lower than the preset heat source demand.

Preferably, the method may further include: detecting a temperature of a heat medium that passes through the heat medium circulation line and is discharged from the heat pump; comparing the detected temperature with a preset water temperature; and increasing a flow rate of a driving heat source that is supplied to the heat pump from the generator heat exchange unit when the detected temperature is equal to or lower than the preset water temperature.

Preferably, the method may further include: detecting a temperature of a heat medium that passes through the heat medium circulation line and is discharged from the heat pump; comparing the detected temperature with a preset water temperature; and increasing a flow rate of heat source water that is supplied to the heat pump from the evaporator heat exchange unit when the detected temperature is equal to or lower than the preset water temperature.

Advantageous Effects

A system for producing a heat source for heating or electricity according to the present invention includes an absorption-type heat pump that generates a high-temperature heat medium using medium- or low-temperature waste heat, a heat production unit that supplies a heat-demanding place with a heat source for heating using the high-temperature heat medium generated by the heat pump, and a generation unit that generates electricity on the basis of the organic Rankine cycle using the high-temperature heat medium generated by the heat pump, and a switching valve unit that performs selective switching such that the high-temperature heat medium is supplied to the heat production unit or the generation unit. The system can produce electricity in a season in which demand for a heat source for heating is low. Therefore, it is possible to use waste heat generated by a power plant or an industrial plane all through the year, thereby increasing waste heat recovery efficiency.

Figure 1:
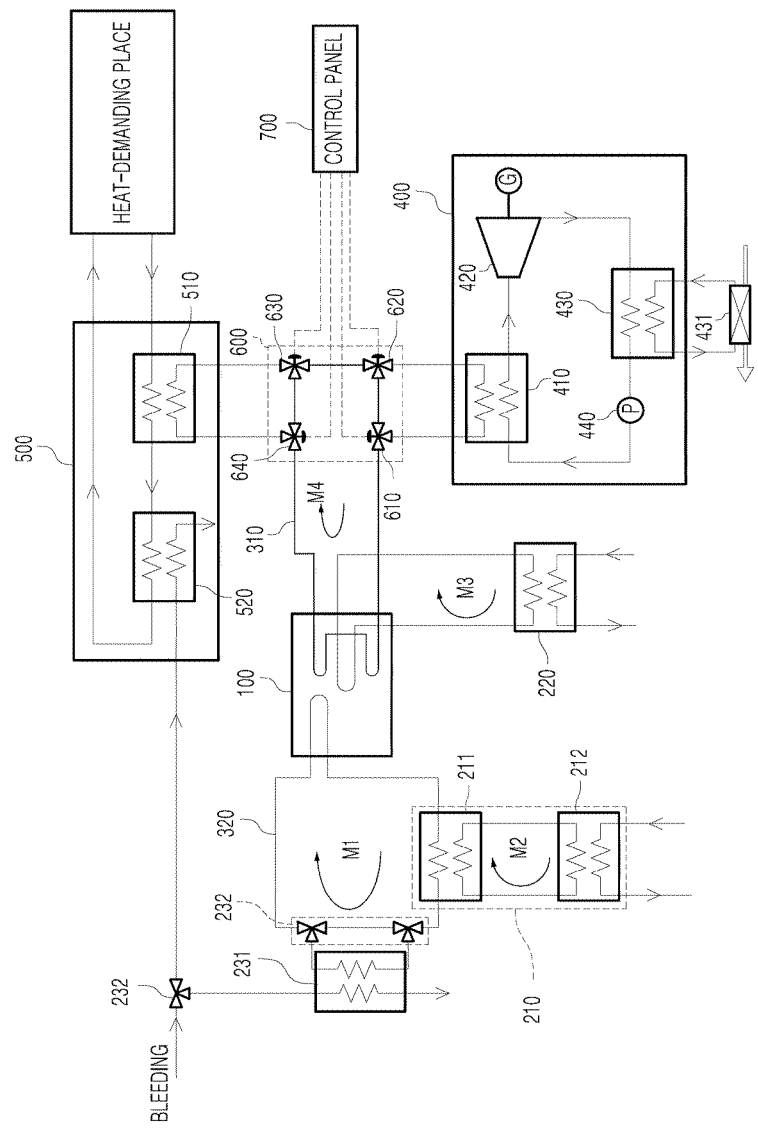
FIG. 1 is a diagram illustrating a system for producing a heat source for heating or electricity.

<Description of the Reference Numerals in the Drawings>

| | |
|---|---|
| 10: Gas turbine | 20 Waste heat recovery boiler |
| 21: Water supply pump | 22: Main chimney |
| 30, 420: Steam turbine | 31: Steam condenser |
| 100: Heat pump | 110: Generator |
| 120: Condenser | 130: Evaporator |
| 141: Absorber | 151: Solution heat exchanger |
| 152: Absorption liquid pump | |
| 210: Generator heat exchange unit | |
| 220: Evaporator heat exchange unit | |
| 310: Heat medium circulation line | |
| 320: Driving heat source circulation line | |
| 400: Generation unit | 410: Vapor generator |
| 430: Condenser | 431: LNG evaporator |
| 440: Water supply pump | 500: Heat production unit |
| 600: Switching valve unit | 700: Control panel |

BEST MODE

Specific structural and functional descriptions of embodiments of the present invention disclosed herein are only for illustrative purposes of the embodiments of the present invention. The present invention may be embodied in many different forms. Furthermore, the embodiments of the present invention disclosed herein should not be construed as limiting the present invention but be interpreted as including all alternatives, modifications, equivalents that may be included within the spirit and scope of the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, preferred embodiments of the present invention will be described in detail with reference to the accompanying drawings.

As illustrated in FIG. 1, the present invention includes: an absorption-type heat pump 100 supplied with a driving heat source and heat source water to increase a temperature of a heat medium to a high temperature and discharge the heat medium; an absorption-type heat pump 100 supplied with a driving heat source and heat source water to heat a low-temperature heat medium by means of absorption heat and condensation heat and discharge the heat medium; a regenerator heat exchange unit 210 for supplying a regenerator 110 with a driving heat source using medium- or low-temperature waste heat; an evaporator heat exchange unit 220 for supplying an evaporator with heat source water; a heat medium circulation line 310 of a closed loop structure for circulating a heat medium that is heated by passing through an absorber 140 and a condenser 120; a generation unit 400 branching off from the heat medium circulation line 310 to undergo indirect heat exchange with the high-temperature heat medium and drive a steam turbine 430 on the basis of the Rankine cycle, thereby producing electricity; a heat production unit 500 branching off from the heat medium circulation line 310 to undergo indirect heat exchange with the high-temperature heat medium and supply a heat-demanding place with a heat source for heating; and a switching valve unit 600 provided on the heat medium circulation line 310 to selectively control the flow of heat medium such that the heat medium is supplied to the generation unit 400 or the heat production unit 500.

The absorption-type heat pump 100 can produce medium-temperature energy from high-temperature driving heat energy and low-temperature waste heat energy by using a heat medium, an absorbent, or a mixture of a heat medium and an absorbent as a circulation material, or produce high-temperature energy and low-temperature energy using medium-temperature waste heat energy as driving heat energy.

A typical heat pump uses water that can be heated up to a high temperature as a coolant and uses lithium bromide (LiBr) as an absorbent.

Figure 2:
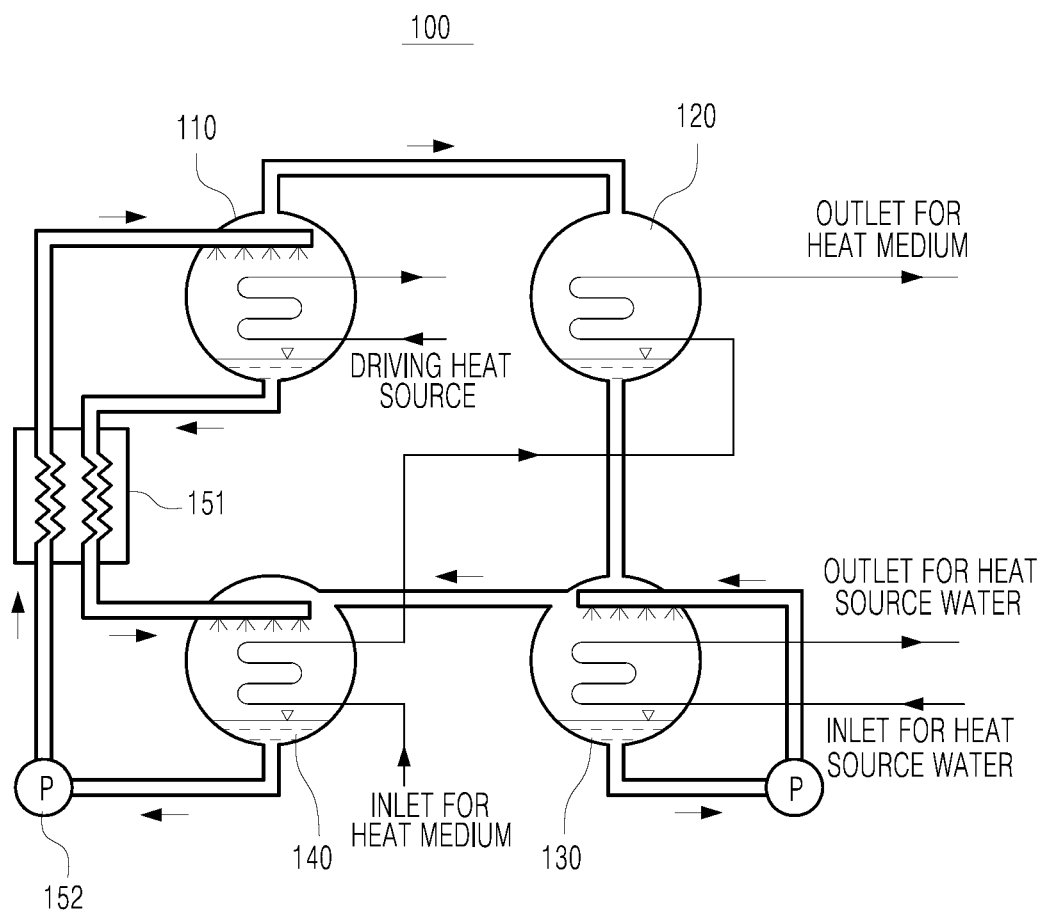
FIG. 2 is a diagram illustrating a preferred example of an adsorption-type heat pump of the system for producing a heat source for heating or electricity.

Specifically, as illustrated in FIG. 2, the absorption-type heat pump 100 includes a generator 110 that generates coolant vapor using waste heat as a driving heat source, a condenser 120 that condenses the coolant vapor generated by the generator 110, an evaporator 130 that vaporizes the coolant that is condensed by the condenser 120 using heat source water, and an absorber 140 that generates absorption heat by absorbing the coolant vapor that is generated by the evaporator 130 using an absorbent.

A weak solution that undergoes absorption of the coolant vapor in the absorber 140 is pressurized by passing through a solution absorbent pump 152 and is then transferred to the generator 110. To increase cycle efficiency, the heat pump 100 may further include a solution heat exchange unit 151 so that the weak solution can be preheated using a strong solution of a high temperature that is supplied from the generator 110 before the weak solution is transferred to the generator 110.

In operation of the absorption-type heat pump 100 described above, waste heat serving as a driving heat source is supplied to the generator 100 and thus coolant vapor is generated from the weak solution. The coolant vapor undergoes heat exchange with the heat medium in the condenser 120 and is thus condensed.

The coolant, which is the coolant vapor condensed by the condenser 120, absorbs the heat of heat source water in the evaporator 130 and is thus vaporized by the evaporator 130.

The coolant vapor produced by the evaporator 130 is transferred to the absorber 140 and is absorbed into a strong solution that is supplied to the absorber 140 from the generator 110. As a result, absorption heat is generated. The absorption heat is absorbed by a heat medium that is supplied from outside, which increases a temperature of the heat medium and results in production of a weak solution. The weak solution in the absorber 140 is transferred to the generator 110 by a liquid absorbent pump 152. The operation cycle described above is repeated.

In the process described above, the heat medium supplied to the heat pump 100 undergoes primary heating by absorbing absorption heat generated by the absorber 140 and then secondary heating by passing through the condenser 120 that condenses the coolant vapor. After that, the heat medium is discharged from the heat pump 100.

Referring to FIG. 1, the heat medium heated by the heat pump 100 circulates through the heat medium circulation line 310 having a closed loop structure.

The generator heat exchange unit 210 supplies a driving heat source to the generator of the heat pump 100 using medium-temperature waste heat. The medium-temperature waste heat may be exhaust gas or vapor that comes out of power plants, fuel cells, or industrial facilities.

Preferably, the generator heat exchange unit 210 includes a first heat exchange unit 211 that circulates a driving heat source to the generator of the heat pump 100 and a second heat exchange unit 212 that undergoes indirect heat exchange with exchange gas that exits from a chimney of a power plant and with the first heat exchange unit 211.

Since indirect heat exchange takes place via the first heat exchange unit 211 and the second heat exchange unit 212, when the generator heat exchange unit 210 supplies the generator of the heat pump 100 with a driving heat source, stable operation is performed without influencing operation of a facility (power plant) that emits exhaust gas (or vapor).

Preferably, a third heat exchange unit 231 may be provided on a driving heat source circulation line 320 through which a driving heat source is circulated between the generator heat exchange unit 210 and the generator of the heat pump 100. The third heat exchange unit 231 undergoes heat exchange through bleeding of a waste heat recovery boiler that recovers heat using the exhaust gas that exits from the chimney of the power plant.

More preferably, the third heat exchange unit 231 further includes a control valve 232 that is installed on the driving heat source circulation line 320 and is connected in series to the generator heat exchange unit 210 to control the flow of a heat medium at the time of bleeding. Therefore, it is possible to supply the driving heat source circulation line 320 with additional heat energy through bleeding by operating the control valve.

Therefore, the driving heat source of the heat pump 100 can be obtained through the heat exchange with waste heat via the generator heat exchange unit 210. Alternatively, the driving heat source of the heat pump 100 may be obtained using an auxiliary heat source and the third heat exchange unit 231.

The present invention can recover waste heat generated by a combined cycle power plant when it is linked to the combined cycle power plant. The present invention can supply a heat-demanding place with a heat source for heating or produce electricity using the recovered heat.

The evaporator heat exchange unit 220 supplies the evaporator of the heat pump 100 with waste heat of a low temperature within a range from 10 to 40° C. as heat source water. Coolant water, sewage, waste water, or sea water discharged from a power plant or an industrial plant can be used as the heat source water.

Examples of the evaporator heat exchange unit 220 include a sea water heat exchanger or a cooling tower of a power plant or an industrial plant to which the heat pump is linked.

The generation unit 400 branches off from the heat medium circulation line 310. The generation unit 400 undergoes indirect heat exchange with a high-temperature heat medium and drives a steam turbine 430 on the basis of the Rankine cycle, thereby producing electricity.

The generation unit 400 includes a vapor generator 410 that undergoes heat exchange with the high-temperature heat medium that flows through the heat medium circulation line 310 to generate vapor, a steam turbine 420 that is driven by the steam generator 410 to drive a generator, a condenser 430 that condenses vapor that exits from the steam turbine 420, and a water supply pump 440 that circulates and supplies an operation fluid.

Preferably, the generation unit 400 drives the steam turbine 420 on the basis of the Organic Rankine Cycle in which an organic heat medium is used as the operation fluid.

The organic heat medium has a boiling point lower than that of water. Therefore, the organic heat medium is vaporized at a low temperature, which enables production of electricity using a low-temperature heat source.

The kind of the organic heat medium is determined according to a temperature range and/or heat efficiency of a cycle. For example, a Freon-based material (for example, R-245fa) may be used in low-temperature condition and a carbon-based material (for example, propane) may be used in high-temperature condition.

Preferably, the generation unit 400 may further include an LNG evaporator 431 that performs heat exchange with the condenser 430 that condenses the vapor that exits from the steam turbine 420.

The LNG evaporator 431 increases a temperature of natural gas that is supplied to a gas turbine from an LNC combined cycle power plant. According to the present invention, the LNG evaporator is linked to an LNG combined cycle power plant and is a means for heating natural gas. The LNG evaporator undergoes heat exchange with the condenser 430 of the generation unit 400.

Since the LNG evaporator 430 undergoes heat exchange with the generation unit 400, the present invention can save energy by being linked to generation facilities of an LNG combined cycle power plant.

The heat production unit 500 branches off from the heat medium circulation line 310 and undergoes indirect heat exchange with high-temperature heat medium to supply a heat-demanding place with a heat source for heating. The heat production unit 500 may be a heat exchanger 510 that undergoes indirect heat exchange with a heat medium. The heat production unit 500 may further include an auxiliary heat exchanger 520 that performs heat exchange through the bleeding described above.

A valve 232 that can control bleeding may be provided on a bleeding supply line.

The switching valve unit 600 is provided on the heat medium circulation line 310 and can selectively control the flow of the heat medium such that the heat medium is supplied to the generation unit 400 or the heat production unit 500.

Preferably, the switching valve unit 600 includes a first switching valve module 610, 620 that controls the flow of a heat medium such that the heat medium is supplied to the generation unit 400 and a second switching valve module 630, 640 that controls the flow of a heat medium such that the heat medium is supplied to the heat production unit 500. The first switching valve module 610, 620 and the second switching valve module 630, 640 are arranged in series with each other on the heat medium circulation line 310 and are linked to each other to be opened and closed together.

Each of the switching valve modules may be a three-way valve, and can be automatically controlled by a control panel 700 to switch channels.

Figure 3:
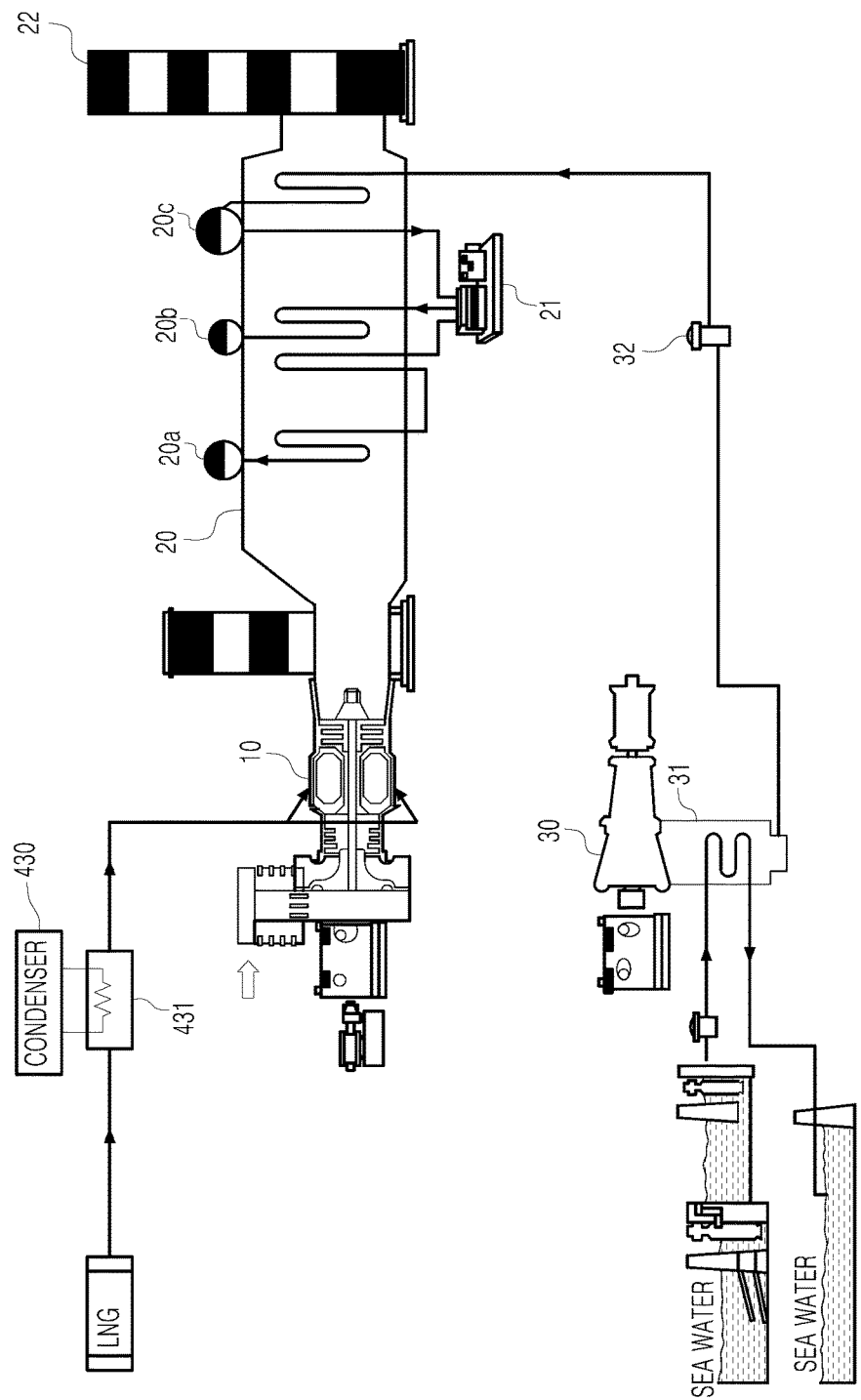
FIG. 3 is a diagram illustrating the configuration of an LNG combined cycle power plant that can be linked to a system for producing a heat source for heating or electricity according to the present invention.

FIG. 3 is a diagram illustrating the configuration of an LNG combined cycle power plant that can be linked to the system for producing a heat source for heating or electricity according to the present invention.

In an LNG combined cycle power plant that can be linked to the system according to the present invention, natural gas combusts at high temperature and high pressure and is then supplied to a gas turbine 10. The gas turbine 10 is driven to perform primary power generation. Exhaust gas discharged from the gas turbine 10 is emitted from a chimney 22 via an exhaust gas recovery boiler 20. A fluid that is stored in high-pressure, medium-pressure, and low-pressure drums 20a, 20b, and 20c of the waste heat recovery boiler 20 is heated by waste heat of exhaust gas discharged from the gas turbine 10, thereby changing to vapor. The vapor of the fluid is supplied to the steam turbine 30 via a vapor pipe by a water supply pump 21.

The steam turbine 30 is driven to perform secondary power generation. The vapor discharged from the steam turbine 30 is condensed by a condenser 31 and then transferred back to the high-pressure, medium-pressure, and low-pressure drums 20a, 20b, and 20c of the waste heat recovery boiler 20 by a condensate pump 32.

The condenser 31 condenses vapor discharged from the steam turbine 30 in which the vapor is produced through a process in which sea water is circulated by a seawater lifting pump and a circulation pump and undergoes heat exchange.

The LNG combined cycle power plant is constructed such that the condenser 420 of the generation unit can undergo heat exchange with the LNG evaporator 431. Therefore, it is unnecessary to use an additional heater to heat natural gas. That is, the natural gas can be heated using condensation heat that is generated during operation of the generation unit.

With reference to FIG. 1, medium- or low-temperature waste heat of the generator heat exchange unit 210 can be heated using exhaust gas that is transferred to the waste heat recovery boiler 20 from the LNG combined cycle power plant, or vapor that is generated by a drum of the waste heat recovery boiler 20.

According to the present invention, the evaporator heat exchange unit 220 undergoes heat exchange with sea water to supply heat source water to the heat pump 100. In the bleeding for heat exchange with the third heat exchange unit 231, vapor generated by the waste heat recovery boiler 20 can be used.

The system of the present invention is linked to the LNG combined cycle power plant, so that waste heat that is generated during operation of a power generation facility can be positively used. In this way, waste heat can be recovered.

Figure 4:
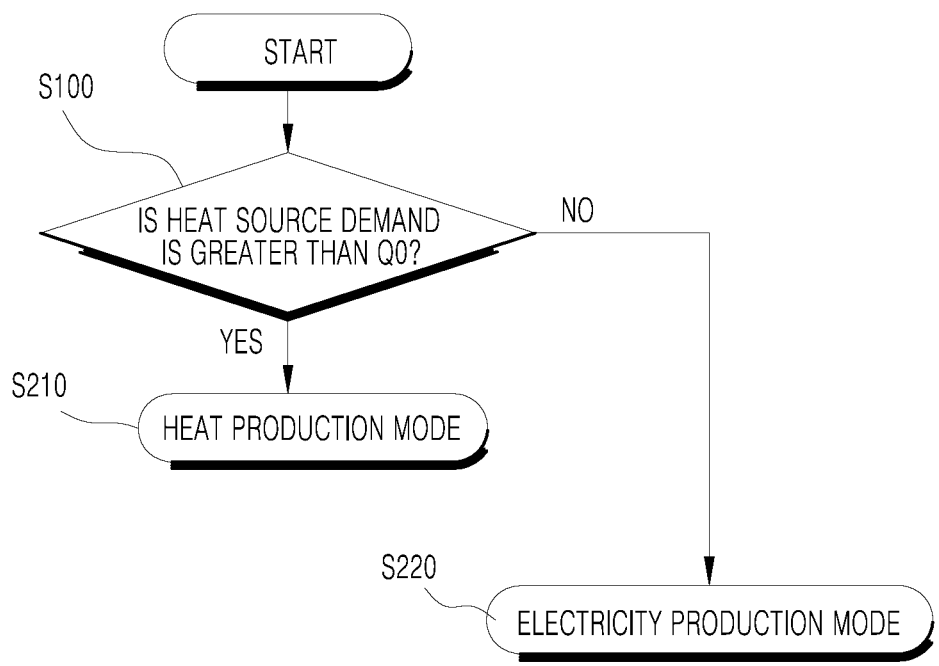
FIG. 4 is a flowchart illustrating a method for controlling the system for producing a heat source for heating or electricity according to one embodiment of the invention.

FIG. 4 is a flowchart illustrating a method for controlling the system for producing a heat source for heating or electricity according to one embodiment of the present invention.

As exemplarily illustrated in FIG. 4, the system of the present invention selectively operates in heat production module 5210 or electricity production module 5220.

That is, heat source demand Q of a heat-demanding place is determined (at S100). When the heat source demand Q is higher than predetermined heat source demand Q0, the system of the present invention operates in the heat production module 5210. On the other hand, when the heat source demand Q is equal to or lower than the predetermined heat source demand Q0, the system of the present invention operates in the electricity production module 5220.

For example, since the heat source demand of a heat-demanding place greatly varies according to seasons, a heat source for heating or electricity is selectively produced according to whether it is a winter season or summer season. In a winter season (from November to March) that accounts for 40% of the period of a year, demand for heating is high. Accordingly, in winter seasons, it is possible to supply a heat-demanding place with a heat source for heating using the heat pump.

Figure 5:
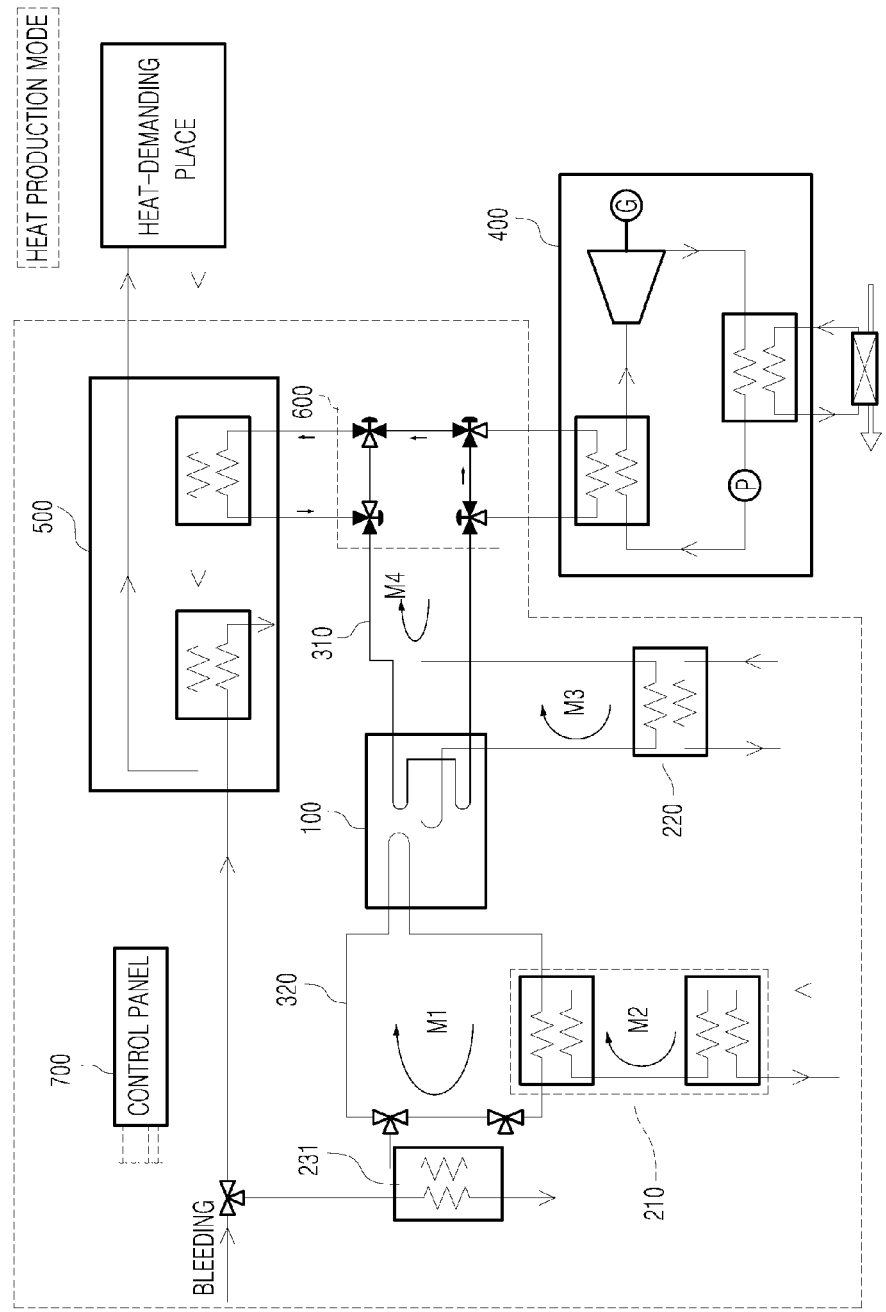
FIG. 5 is a diagram illustrating an operation example of the system of the invention in heat source production mode.

Specifically, with reference to FIG. 5, the heat pump 100 operates in winter seasons so that a high-temperature heat medium flows through the heat medium circulation line 310. The high-temperature heat medium is transferred to the heat production unit 500 to undergo heat exchange. Therefore, it is possible to supply a heat-demanding place with a heat source (the heat source production mode).

Figure 6:
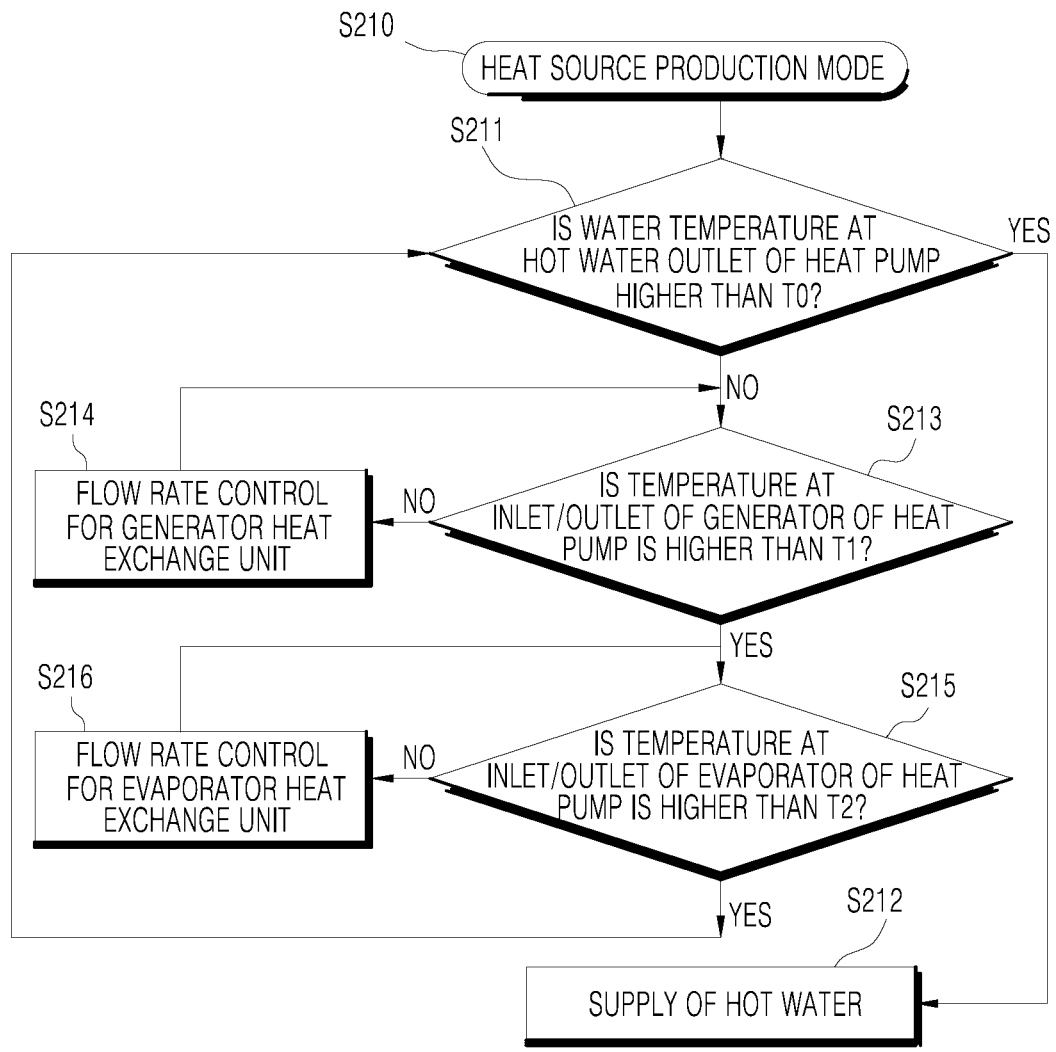
FIG. 6 is a flowchart illustrating a method for controlling the system of the invention in the heat source production mode.

More specifically, with reference to FIG. 6, hot water flows through the heat medium circulation line 310 and a water temperature of the hot water is detected at a hot water outlet of the heat pump 100. Next, the detected water temperature is compared with a first preset water temperature T0 (at S211). When the detected water temperature is higher than the first preset water temperature T0, the hot water is supplied to the heat source production unit 500 (at S212).

When the detected water temperature is equal to or lower than the first preset water temperature T0, a water temperature is detected at an inlet and/or an outlet of the generator of the heat pump 100 and the detected water temperature is compared with a second preset water temperature T1 (at S213). When the detected water temperature is equal to or lower than the second preset water temperature T1, a flow rate of water to the generator heat exchange unit 210 and/or the third heat exchange unit 231 is controlled (at S214). In this way, the supply of a driving heat source that is supplied to the generator via the driving heat source circulation line 320 is increased, so that the water temperature at the hot water outlet of the heat pump 100 can be increased.

On the other hand, when the detected temperature at the inlet and/or outlet of the generator of the heat pump 100 is higher than the second preset water temperature T1, a water temperature at an inlet and/or outlet of the evaporator of the heat pump 100 is compared with a third preset water temperature T2 (at S215). When the detected water temperature is equal to or lower than the third preset water temperature T2, a flow rate of water to the evaporator heat exchange unit 220 is controlled (at S216). That is, supply of heat source water of the heat pump 100 is increased, so that a water temperature at the hot water outlet of the heat pump 100 can be increased.

In short, when the water temperature of hot water that is supplied to the heat production unit 500 via the heat medium circulation line 310 is equal to or lower than the first preset water temperature T0, the driving heat source or heat source water supplied to the generator or evaporator of the heat pump 100 is actively controlled so that the hot water supplied to the heat production unit 500 is supplied after being heated to a predetermined temperature.

Figure 7:
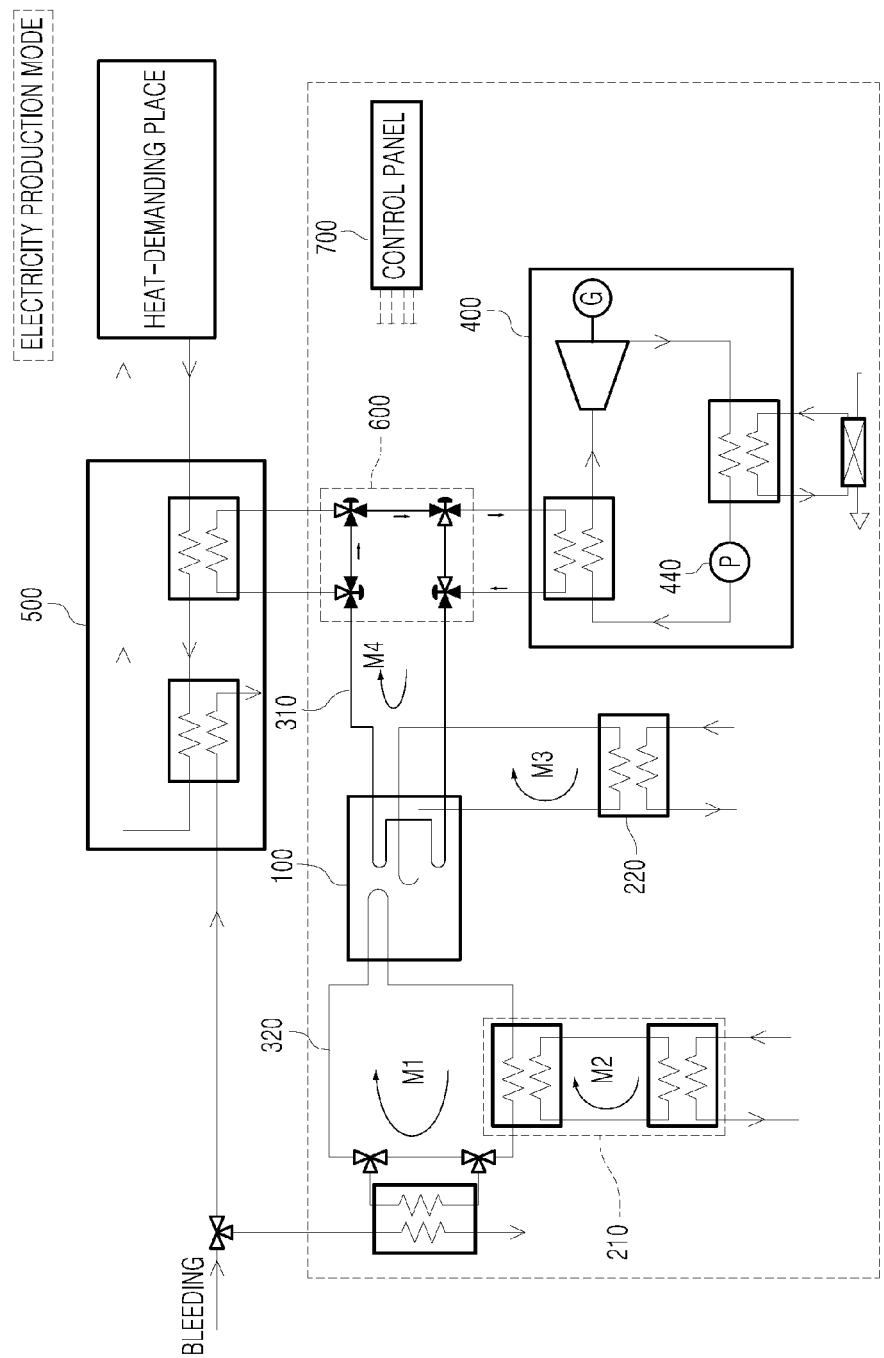
FIG. 7 is a diagram illustrating an operation example of the system of the invention in electricity production mode.

Next, as illustrated in FIG. 7, in summer seasons (from April to October) in which demand for heating is low, the heat pump 100 is operated so that a high-temperature heat medium can flow through the heat medium circulation line 310. The high-temperature heat medium is transferred to the generation unit 400 and undergoes heat exchange there, thereby producing electricity by driving the steam turbine (the electricity production mode).

Figure 8:
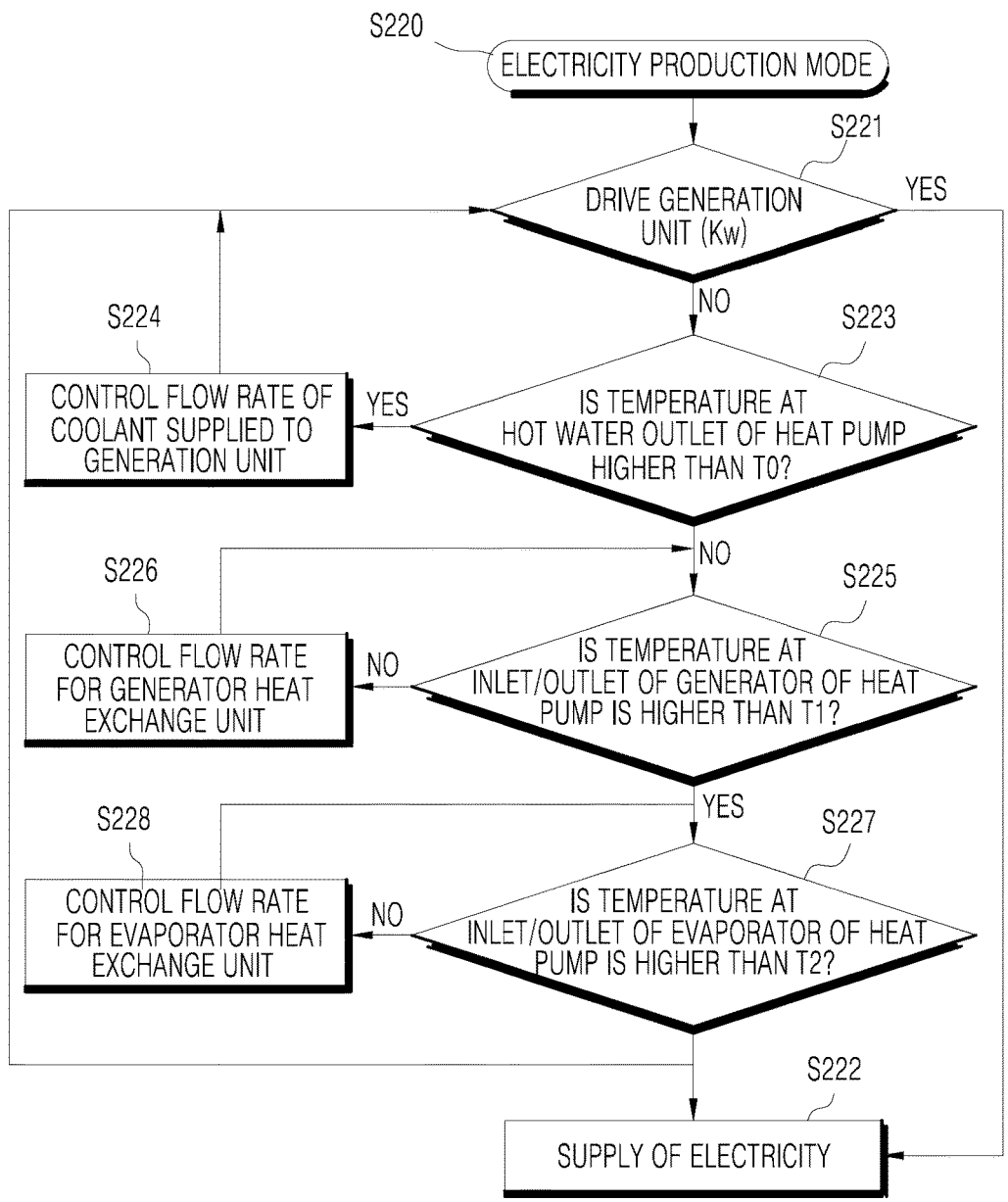
FIG. 8 is a flowchart illustrating a method for controlling the system of the invention in the electricity production mode.

More specifically, with reference to FIG. 8, in the electricity production mode 5220, the generation unit 400 operates to supply electricity (at S222). In this case, an amount of generated electricity is detected (at S221). When the amount of generated electricity is equal to or less than a reference amount, a water temperature of hot water, which flows through the heat medium circulation line 310, is detected at the hot water outlet of the heat pump 100. Next, the detected water temperature is compared with the first preset water temperature T0 (at S223). When the detected water temperature is higher than the first preset water temperature T0, a flow rate of coolant that flows through the generation unit 400 is controlled such that the amount of generated electricity is greater than the reference amount (at S224). In this case, the flow rate of the coolant of the generation unit 400 is controlled through control of the water supply pump 440.

On the other hand, when the detected water temperature is equal to or lower than the first preset water temperature T0, a water temperature is detected at the inlet and/or outlet of the generator of the heat pump 100 and the detected water temperature is compared with the second preset water temperature T1 (at S225). When the detected water temperature is equal to or lower than the second preset water temperature T1, the flow rate of water to the generator heat exchange unit 210 is controlled (at 5226) such that the supply of the driving heat source supplied to the generator through the driving heat source circulation line 320 is increased. In this way, the water temperature at the hot water outlet of the heat pump 100 is increased.

On the other hand, when the detected water temperature at the inlet and/or outlet of the generator of the heat pump 100 is higher than the second preset water temperature T1, the water temperature at the inlet or outlet of the evaporator of the heat pump 100 is compared with the third preset water temperature T2 (at S227). When the detected water temperature is equal to or lower than the third preset water temperature T2, the flow rate of water to the evaporator heat exchange unit 220 is controlled (at 5228) such that the supply of heat source water of the heat pump 100 is increased. In this way, the water temperature at the hot water outlet of the heat pump 100 can be increased.

In conclusion, the amount of electricity produced by the generation unit 400 is determined. When the amount of generated electricity is equal to or less than a reference amount, the flow rate of coolant that circulates through the generation unit 400 is controlled. Alternatively, when the water temperature of hot water supplied to the generation unit 400 through the heat medium circulation line 310 is equal to or lower than the first preset water temperature T0, the driving heat source supplied to the generator of the heat pump 100 or the heat source water supplied to the evaporator of the heat pump 100 is actively controlled so that the temperature of the hot water supplied to the generation unit 400 can be increased to a predetermined water temperature. Therefore, electricity can be stably produced.

Although temperature detecting means for detecting water temperatures in pipes, and pumps and valves for controlling the flow rate of water in the pipes are not illustrated in the present embodiment, those skilled in the art will appreciate that temperature detecting means and flow rate control means are adequately provided on pipes as necessary to obtain temperature data needed for operation or to control the flow rate.

In this way, production of a heat source for heating or electricity is determined according to whether it is a winter season or summer season through switching of a water channel of the switching valve unit 600 by manipulating a control panel 700.

According to the present embodiment, the heat source production mode or electricity production mode is selected according to whether it is a winter season or summer season. However, operation in the heat source production mode or the electricity production mode can be selectively determined according to whether it is a day time period or a night time period.

In addition, the control panel 700 may receive data such as usage of a heat source for heating, outdoor temperature, and demand for electricity, and the switching valve unit 700 may be automatically controlled based on the data by the control panel 700 according to a programmed process. In addition, the control panel 700 may detect water temperatures of pipes in each operation mode and perform automatic control on the flow rate of hot water so that efficient operation can be performed.

The present invention that has been described above is not limited by the afore-mentioned embodiments and the accompanying drawings, and rather those skilled in the art will appreciate that various substitutions, modifications, and alterations are possible, without departing from the scope and spirit of the invention. For example, according to the embodiment, the system is linked to an LNG combined cycle power plant but it is not limited to the present embodiment. Further, it should be understood that medium- or low-temperature waste heat generated by a power plant or an industrial plant can be used.

What is claimed is:

1. A system for producing a heat source for heating or electricity, using medium- or low-temperature waste heat, the system comprising:
    an absorption-type heat pump supplied with a driving heat source and heat source water to increase a temperature of a heat medium from a low-temperature to a high temperature by means of absorption heat in an absorber and condensation heat in a first condenser and to discharge the heat medium;
    a generator heat exchange unit for supplying a generator with the driving heat source using medium- or low-temperature waste heat;
    an evaporator heat exchange unit for supplying an evaporator with the heat source water;
    a heat medium circulation line having a closed loop structure for circulating the heat medium that is heated while passing through the absorber and the first condenser;
    a generation unit branching off from the heat medium circulation line to undergo indirect heat exchange with the heat medium of the high-temperature and to drive a steam turbine on the basis of a Rankine cycle, thereby producing electricity;
    a heat production unit branching off from the heat medium circulation line to undergo indirect heat exchange with the heat medium of the high-temperature and to supply a heat-demanding place with a heat source for heating; and
    a switching valve unit provided on the heat medium circulation line to control the flow of the heat medium such that the heat medium is supplied to the generation unit or the heat production unit.

2. The system for producing a heat source for heating or electricity, using medium- or low-temperature waste heat, according to claim 1, wherein the evaporator heat exchange unit undergoes heat exchange with sea water.

3. The system for producing a heat source for heating or electricity, using medium- or low-temperature waste heat, according to claim 1, wherein the heat production unit includes a second condenser that condenses vapor that exits from the steam turbine and an LNG evaporator that undergoes heat exchange with the second condenser.

4. The system for producing a heat source for heating or electricity, using medium- or low-temperature waste heat, according to claim 1, wherein the generator heat exchange unit performs heat exchange with exhaust gas that exits from a chimney of a power plant.

5. The system for producing a heat source for heating or electricity, using medium- or low-temperature waste heat, according to claim 4, wherein the generator heat exchange unit includes: a first heat exchange unit that circulates and supplies the driving heat source to the generator of the absorption-type heat pump; and a second heat exchange unit that causes the exhaust gas that exits from the chimney of the power plant and the first heat exchange unit to undergo indirect heat exchange with each other.

6. The system for producing a heat source for heating or electricity, using medium- or low-temperature waste heat, according to claim 1, further comprising a third heat exchange unit provided on a driving heat source circulation line that is used for circulating the driving heat source between the generator heat exchange unit and the generator of the absorption-type heat pump, wherein the third heat exchange unit undergoes heat exchange through bleeding of an exhaust heat recovery boiler that recovers heat using exhaust gas discharged from a chimney of a power plant.

7. The system for producing a heat source for heating or electricity, using medium- or low-temperature waste heat, according to claim 6, wherein the third heat exchange unit further includes a control valve that is arranged on the driving heat source circulation line so as to be connected in series to the generator heat exchange unit and that controls bleeding.

8. The system for producing a heat source for heating or electricity, using medium- or low-temperature waste heat, according to claim 1, wherein the switching valve unit includes:
    a first switching valve module that controls the flow of the heat medium such that the heat medium is supplied to the generation unit; and a second switching valve module that controls the flow of the heat medium such that the heat medium is supplied to the heat production unit, and wherein the first switching valve module and the second switching valve module are arranged in series with each other on the heat medium circulation line and interlocked with each other to be opened and closed together.

9. A method for controlling a system for producing a heat source for heating or electricity, using medium- or low-temperature waste heat, the system comprising:
   an absorption-type heat pump that includes a generator, a condenser, an evaporator, and an absorber, and is supplied with a driving heat source and heat source water to increase a temperature of a heat medium to a high temperature by means of absorption heat in the absorber and condensation heat in the condenser, and discharges the heated heat medium;
   a generator heat exchange unit for supplying the generator with the driving heat source using medium- or low-temperature waste heat;
   an evaporator heat exchange unit for supplying the evaporator with the heat source water;
   a heat medium circulation line having a closed loop structure for circulating the heat medium that is heated while passing through the absorber and the condenser;
   a generation unit branching off from the heat medium circulation line to undergo indirect heat exchange with the heat medium of the high-temperature and to drive a steam turbine on the basis of a Rankine cycle, thereby producing electricity;
   a heat production unit branching off from the heat medium circulation line to undergo indirect heat exchange with the heat medium of the high-temperature and to supply a heat-demanding place with a heat source for heating; and
   a switching valve unit provided on the heat medium circulation line to control the flow of the heat medium such that the heat medium is supplied to the generation unit or the heat production unit,
   the method comprising:
   switching the switching valve unit according to a heat source demand of the heat-demanding place, thereby supplying the heat-demanding place with the heat source for heating by means of the heat production unit when the heat source demand is higher than a preset heat source demand, and producing electricity by means of the generation unit when the heat source demand is equal to or lower than the preset heat source demand.

10. The method for controlling the system for producing a heat source for heating or electricity, using medium- or low-temperature waste heat, according to claim 9, further comprising:
    detecting a temperature of water that passes through the heat medium circulation line and is discharged from the absorption-type heat pump;
    comparing the detected temperature with a preset water temperature; and
    increasing a flow rate of the driving heat source that is supplied to the absorption-type heat pump from the generator heat exchange unit when the detected temperature is equal to or lower than the preset water temperature.

11. The method for controlling the system for producing a heat source for heating or electricity, using medium- or low-temperature waste heat, according to claim 9, further comprising:
    detecting a temperature of water that passes through the heat medium circulation line and is discharged from the absorption-type heat pump;
    comparing the detected temperature with a preset water temperature; and
    increasing a flow rate of the heat source water that is supplied to the absorption-type heat pump from the evaporator heat exchange unit when the detected temperature is equal to or lower than the preset water temperature.

12. The system for producing a heat source for heating or electricity, using medium- or low-temperature waste heat, according to claim 5, further comprising a third heat exchange unit provided on a driving heat source circulation line that is used for circulating the driving heat source between the generator heat exchange unit and the generator of the absorption-type heat pump, wherein the third heat exchange unit undergoes heat exchange through bleeding of an exhaust heat recovery boiler that recovers heat using exhaust gas discharged from a chimney of a power plant.

13. The method for controlling the system for producing a heat source for heating or electricity, using medium- or low-temperature waste heat, according to claim 10, further comprising:
    detecting a temperature of water that passes through the heat medium circulation line and is discharged from the absorption-type heat pump;
    comparing the detected temperature with a preset water temperature; and
    increasing a flow rate of the heat source water that is supplied to the absorption-type heat pump from the evaporator heat exchange unit when the detected temperature is equal to or lower than the preset water temperature.

* * * * *